(12) United States Patent
Cai et al.

(10) Patent No.: US 12,571,674 B2
(45) Date of Patent: Mar. 10, 2026

(54) MULTI-SPAN OPTICAL FIBER DAS SYSTEM WITH DISPERSION MANAGEMENT AND STAGGERED SENSING PULSES

(71) Applicant: SUBCOM, LLC, Eatontown, NJ (US)

(72) Inventors: Jin-Xing Cai, Morganville, NJ (US); Carl R. Davidson, Warren, NJ (US); William W. Patterson, Freehold, NJ (US); Alexei N. Pilipetskii, Colts Neck, NJ (US)

(73) Assignee: SubCom, LLC, Eatontown, NJ (US)

( * ) Notice: Subject to any disclaimer, the term of this patent is extended or adjusted under 35 U.S.C. 154(b) by 300 days.

(21) Appl. No.: 18/224,465

(22) Filed: Jul. 20, 2023

(65) Prior Publication Data

US 2024/0027260 A1     Jan. 25, 2024

Related U.S. Application Data

(60) Provisional application No. 63/391,039, filed on Jul. 21, 2022.

(51) Int. Cl.
*G01H 9/00* (2006.01)

(52) U.S. Cl.
CPC .................................. *G01H 9/004* (2013.01)

(58) Field of Classification Search
None
See application file for complete search history.

(56) References Cited

U.S. PATENT DOCUMENTS

2001/0040718 A1* 11/2001 Townsend ............ G01V 1/3817
                                                                    359/285
2012/0297883 A1* 11/2012 Kupershmidt ......... G01H 9/004
                                                                    73/655
2017/0219736 A1* 8/2017 Bhongale ......... H04B 10/25077

FOREIGN PATENT DOCUMENTS

EP           4020847 A1     6/2022

OTHER PUBLICATIONS

European Search Report for EP Application No. 23186431.5, dated Nov. 24, 2023, 8 pages.

(Continued)

*Primary Examiner* — Eric S. McCall
*Assistant Examiner* — Nigel H Plumb
(74) *Attorney, Agent, or Firm* — KDW Firm PLLC

(57) ABSTRACT

An undersea sensing system may include a first distributed acoustic sensing (DAS) station, comprising a first DAS transmitter and a first DAS receiver connected by an undersea optical communications cable. The first DAS transmitter is configured to launch a first outbound DAS signal in a first direction, over at least one sensing span of the optical communications cable. The DAS receiver is configured to receive a backscattered Rayleigh signal, based upon the first outbound DAS signal, wherein the first DAS signal is transmitted over a first D− fiber in a first half of the sensing span, and is transmitted over a first D+ fiber over a second half of the sensing span. The system further includes a second DAS station having a second DAS transmitter to launch a second outbound DAS signal in a second direction, opposite the first direction, over the at least one span. A second DAS receiver receives a second backscattered Rayleigh signal, based upon the second outbound DAS signal, wherein the second DAS signal is transmitted over a second D− fiber in the second half of the sensing span and is (Continued)

250 transmitted over a second D+ fiber over the first half of the sensing span.

9 Claims, 7 Drawing Sheets

(56) References Cited

OTHER PUBLICATIONS

M. E. Fermann et al., "Nonlinear amplifying loop mirror," Opt. Lett. 15, 752-754 (1990).

Document No. SEAFOM—Measuring Sensor Performance Document—02 (SEAFOM MSP-02) DAS Parameter Definitions and Tests Issue Date: Aug. 2018, https://seafom.com/published-documents/.

Muhammad I. M. Abdul Khudus et al., "Phase matched parametric amplification via four-wave mixing in optical microfibers," Opt. Lett. 41, 761-764 (2016).

* cited by examiner

250

200

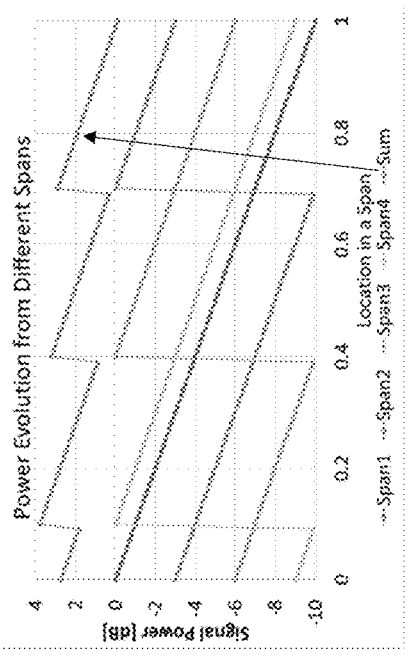
FIG. 6
FIG. 5
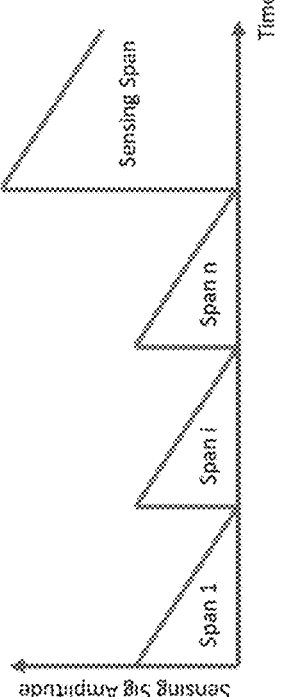
FIG. 7

MULTI-SPAN OPTICAL FIBER DAS SYSTEM WITH DISPERSION MANAGEMENT AND STAGGERED SENSING PULSES

RELATED APPLICATIONS

This application claims priority to U.S. provisional patent application Ser. No. 63/391,039, entitled MULTISPAN OPTICAL FIBER SYSTEM FOR IMPROVED DISTRIB-UTED ACOUSTIC SENSING, filed Jul. 21, 2022, and incorporated by reference herein in its entirety.

BACKGROUND

Field

Embodiments of the present disclosure relate to the field of optical communication systems. In particular, the present disclosure relates to techniques for extending and improving the sensitivity of distributed acoustic sensing (DAS) in undersea optical cables.

Discussion of Related Art

In a distributed acoustic sensing (DAS) system, an optical cable may be used to provide continuous real-time or near real-time monitoring of perturbations or anomalies in the vicinity of the cable. In other words, the cable itself may be used as a sensing element to detect or monitor different types of disruptions, interferences, irregularities, acoustic vibra-tions activities, whether natural or man-made occurring in or out of the local DAS environment near the cable, (e.g., terrestrial environment, oceanic environment). To do so, optoelectronic devices/equipment constituting the DAS sys-tem and coupled to the optical cable may detect and process reflected light signals (e.g., Rayleigh backscatter signals) over a range at a specific distance in the cable system.

Generally, a DAS system may include a station that acts as an interrogator unit (IU) to probe a fiber optic cable using a coherent laser pulse, where changes in the phase of the returned optical backscatter signal are measured. Optical phase shifts between pulses may be proportional to strain in the fiber, leading to the ability to detect vibrations and the like, as measured by the effect of such perturbations on the phase. For example, the DAS system may be based on Rayleigh backscattering (otherwise referred to as a Ray-leigh-backscattering-based DAS system).

In known approaches, distributed sensing is limited to <50 km to 150 km and only one fiber span can be sensed. The sensing fiber is typically Multi-Mode Fiber (MMF), Single-Mode Fiber (SMF) or other fiber types with positive dispersion, typically exhibiting low loss which leads to higher sensing sensitivity. The maximum peak power that can be launched into such sensing spans with positive dispersion is limited to approximately 23 dBm due to fiber nonlinearities. Accordingly, the DAS range and sensing capabilities of known DAS systems is significantly limited.

It is with respect to these and other considerations that the present disclosure is provided.

BRIEF SUMMARY

In one embodiment, a system is provided. The system may include a distributed acoustic sensing (DAS) station, comprising a DAS transmitter to launch an outbound DAS signal in a first direction, over at least one span of an optical communications link (which DAS signal may be used for sensing just the very first span). The system may further include a DAS receiver to analyze the backscattered Ray-leigh signal, based upon the outbound DAS signal, wherein the DAS signal is transmitted at least in part over a D– fiber.

In another embodiment, a communications system is provided, including a communications cable that extends over at least one span of an optical communications link. The communications system may also include a distributed acoustic sensing (DAS) station, comprising a DAS trans-mitter to launch an outbound DAS signal in a first direction, over the at least one span of the optical communications link, and a DAS receiver to analyze the backscattered Rayleigh signal, based upon the outbound DAS signal, wherein the DAS signal is transmitted at least in part over a D– fiber.

In a further embodiment, a method of performing distrib-uted acoustic sensing (DAS) is provided. The method may include launching an outbound DAS signal from a DAS transmitter of a DAS station in a first direction, over an optical fiber, wherein the optical fiber span is a hybrid of D– and D+ fiber segment. The method may include routing the outbound DAS signal using a first external circulator to a local span of a multi-span link, adjacent to the DAS station, and routing the outbound DAS signal through a sensing span of the multi-span link, different from the local span, using a second external circulator. The method may also include routing the backscattered Rayleigh signal, derived from the outbound DAS signal through the second external circulator in a second direction, opposite the first direction, and routing the backscattered Rayleigh signal to a DAS receiver at the DAS station, using the first external circulator.

BRIEF DESCRIPTION OF THE DRAWINGS

FIG. 5 shows an exemplary staggered DAS profile—from a Tx, in accordance with some embodiments of the disclo-sure;

FIG. 6 shows a staggered Rayleigh profile—at Rx, in accordance with some embodiments of the disclosure; and FIG. 7 shows a locally amplified sensing signal, in accordance with some embodiments of the disclosure.

DESCRIPTION OF EMBODIMENTS

Figure 1B:
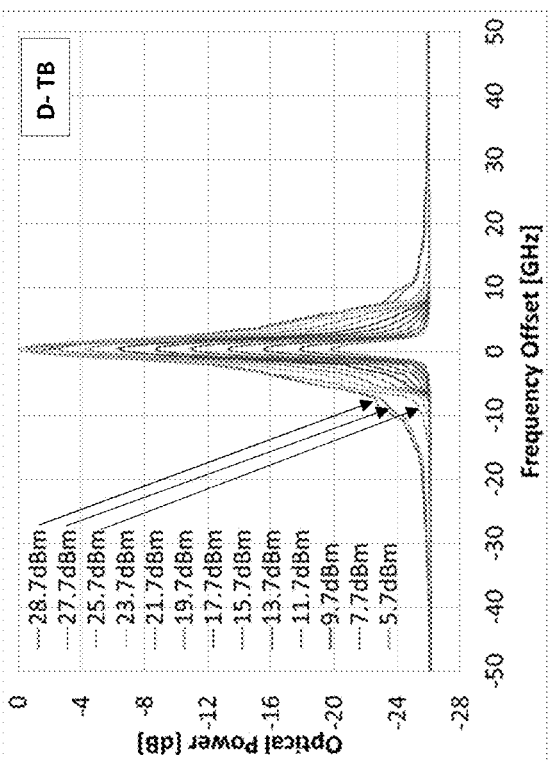
FIG. 1A and FIG. 1B illustrate sensing signal power depletion due to Modulation Instability (MI) and Four Wave Mixing (FWM) in D+ fiber and D– fiber, respectively.

The present embodiments will now be described more fully hereinafter with reference to the accompanying draw-ings, in which exemplary embodiments are shown. The scope of the embodiments should not be construed as limited to the embodiments set forth herein. Rather, these embodi-ments are provided so that this disclosure will be thorough and complete, and will fully convey the scope of the embodiments to those skilled in the art. In the drawings, like numbers refer to like elements throughout.

Before detailing specific embodiments with respect to the figures, general features with respect to the embodiments will be reviewed. Novel DAS apparatus, systems, and architecture, and techniques are provided to improve DAS sensing capability, in particular, across one or more spans of an optical communication system including undersea and terrestrial optical cables. According to various embodiments, the range of DAS sensing is improved by introducing negative dispersion fiber (D– fiber) in the DAS system.

By way of reference, in a single or multi-span sensing system using known positive dispersion (D+) fibers, the maximum power is limited by signal power depletion due to modulation instability (MI). MI is an exponential nonlinear process where the nonlinear interference (NLI) power increases exponentially. MI occurs in a D+ fiber under certain phase matching conditions (within a frequency/wavelength range of a strong pump signal). In a D+ fiber, the NLI power grows exponentially according to:

$$G_{MI} = \frac{P_{out}(L)}{P_{in}(0)} = (\gamma P_p L_e)^2 \left( \frac{\sinh(N_A g_{MI} L_e/2)}{(g_{MI} L_e/2)} \right)^2 e^{-\alpha L}$$

where $G_{MI}$ is the MI gain, $P_{in}(0)$ is the injected Stokes power at the fiber input, $P_{out}(L)$ is the generated anti-Stokes power at the fiber output, $\gamma$ is the fiber nonlinear coefficient, $P_p$ is the peak DAS signal (pump) power at the fiber input, L is the fiber length of the sensing segment, $L_e$ is the effective fiber length, $N_A$ is the number of amplified spans leading to the sensing point, $g_{MI}$ is the gain coefficient of the MI process and $\alpha$ is fiber loss.

In various embodiments of the disclosure, in a sensing system, such as a DAS system, a D– fiber is provided as a sensing fiber, mitigating the aforementioned modulation instability. In a D– fiber, NLI is dominated by four wave mixing (FWM), where the NLI grows quadratically according to:

$$G_{FWL} = \frac{P_{out}(L)}{P_{in}(0)} = (\gamma P_p L_e)^2 \left( \frac{\sin(N_A \Delta \beta L_e/2)}{(\Delta \beta L_e/2)} \right)^2 \eta_{1span} e^{-\alpha L}$$

where $G_{FWM}$ is the aggregate FWM gain, $P_{in}(0)$ is the injected optical power at the fiber input; $P_{out}(L)$ is the FWM generated optical power at the fiber output; $\Delta \beta$ is the phase matching condition of the FWM process; $\eta_{1span}$ is the FWM efficiency in a single span, that is governed by fiber loss, phase match condition, span length, among other features.

Figure 1A:
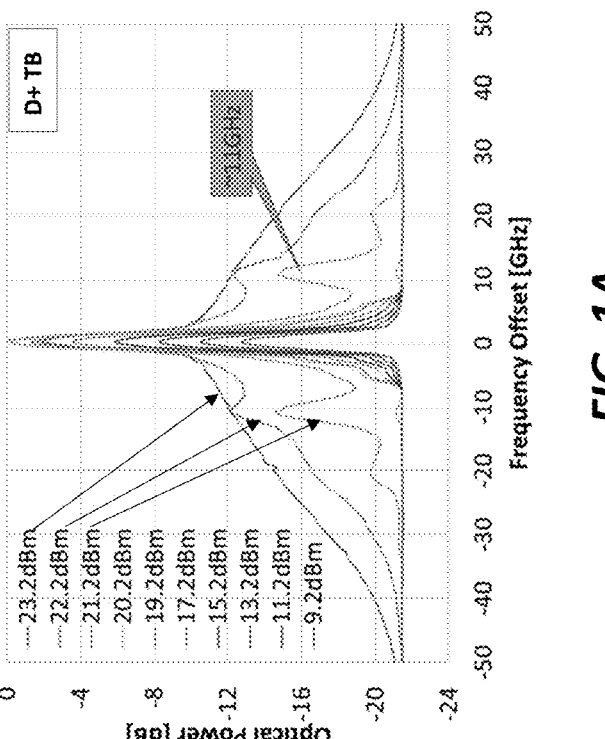

FIG. 1A and FIG. 1B provide a comparison of NLI power vs signal frequency offset using predominantly D+ fiber spans (where the span input has the fiber with the larger effective area) or purely D– fiber spans with large local dispersion. What is shown is the sensing signal power depletion due to MI and Four Wave Mixing (FWM) in D+ fiber and D– fiber respectively. The optical spectrum in D+ fiber shows a very strong pedestal at high launch power. On the other hand, D– fiber shows very little NLI power even for ~29 dBm launch power (where power is limited by the testing equipment).

Figure 2B:
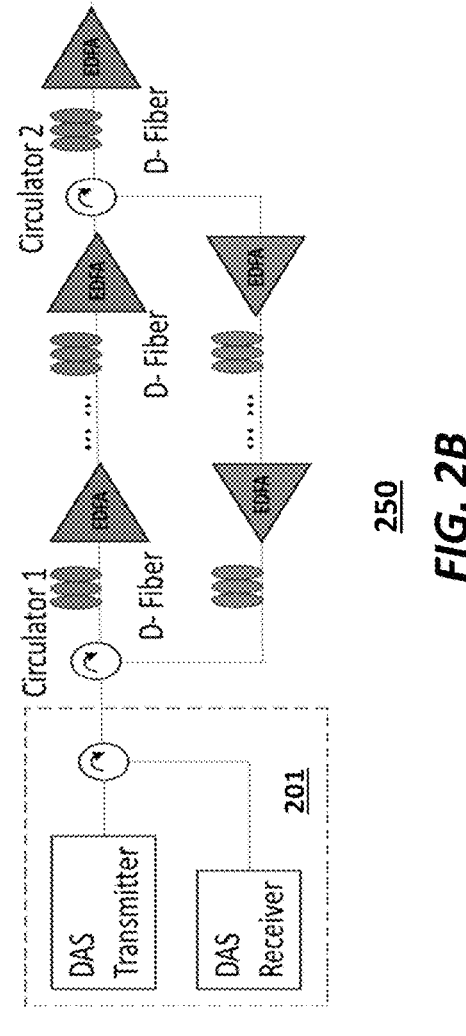
FIG. 2B illustrates the architecture of another DAS sys-tem according to embodiments of the disclosure.
Figure 2A:
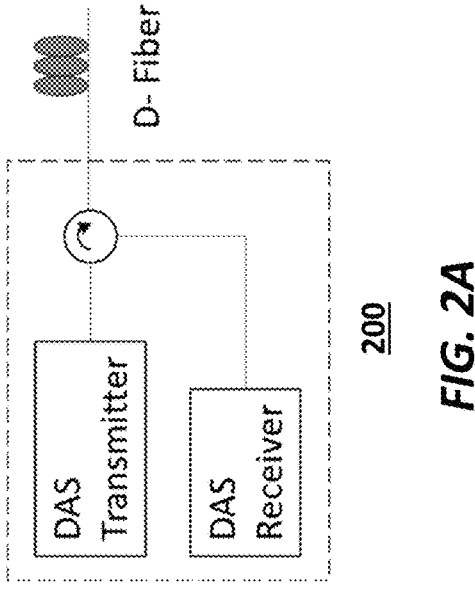
FIG. 2A illustrates the architecture of a DAS system according to embodiments of the disclosure.

FIG. 2A shows a schematic of a DAS sensing apparatus 200, which apparatus uses a single D– fiber span. FIG. 2B illustrates a schematic of a DAS sensing apparatus 250 that is arranged for multi-span sensing using D– fiber. In DAS sensing apparatus 250, two extra circulators are provided in addition to the circulator that is adjacent the DAS transmitter, in order to route the outbound DAS signal and the Rayleigh backscattered signal. Circulator 1 routes a DAS signal sent from the DAS transmitter to the first fiber span, meaning a fiber span that is adjacent to the DAS station 201. The circulator 1 also routes the Rayleigh backscattered signal to the DAS receiver. Circulator 2 routes the forward DAS signal to the sensing span and routes the Rayleigh backscattered signal in the backward direction. Note that this configuration allows tapping of any span in a link with a DAS signal (using the $2^{nd}$ circulator) and sending the Rayleigh backscattered signal to the DAS receiver through the $1^{st}$ circulator. Moreover, the D– fibers can be used in any sensing system to improve sensitivity by launching more DAS signal power, e.g. D– fibers can be used in a multispan system to improve sensing sensitivity by ~10 dB (see, e.g., FIG. 4A). Furthermore, the fibers carrying the Rayleigh signal can be low loss fiber with positive dispersion to increase the OSNR of the Rayleigh signal. Note that as used herein, the term link may refer to an entire system length, for example, between one terminal and another terminal of a communications system, while the term span refers to the distance between adjacent repeaters, or adjacent amplifiers along the link.

A notable feature for the embodiments of FIGS. 2A and 2B is the implementation of D– fiber as the distributed sensing media, and the use of two circulators to route the forward DAS signal and backward Rayleigh scattered signal. By using a D– fiber as the distributed sensor, the system optical signal to noise ratio (OSNR) may be improved significantly over present day DAS schemes, since the D– fiber can tolerate much more optical power before the DAS signal is significantly depleted.

Figure 3A:
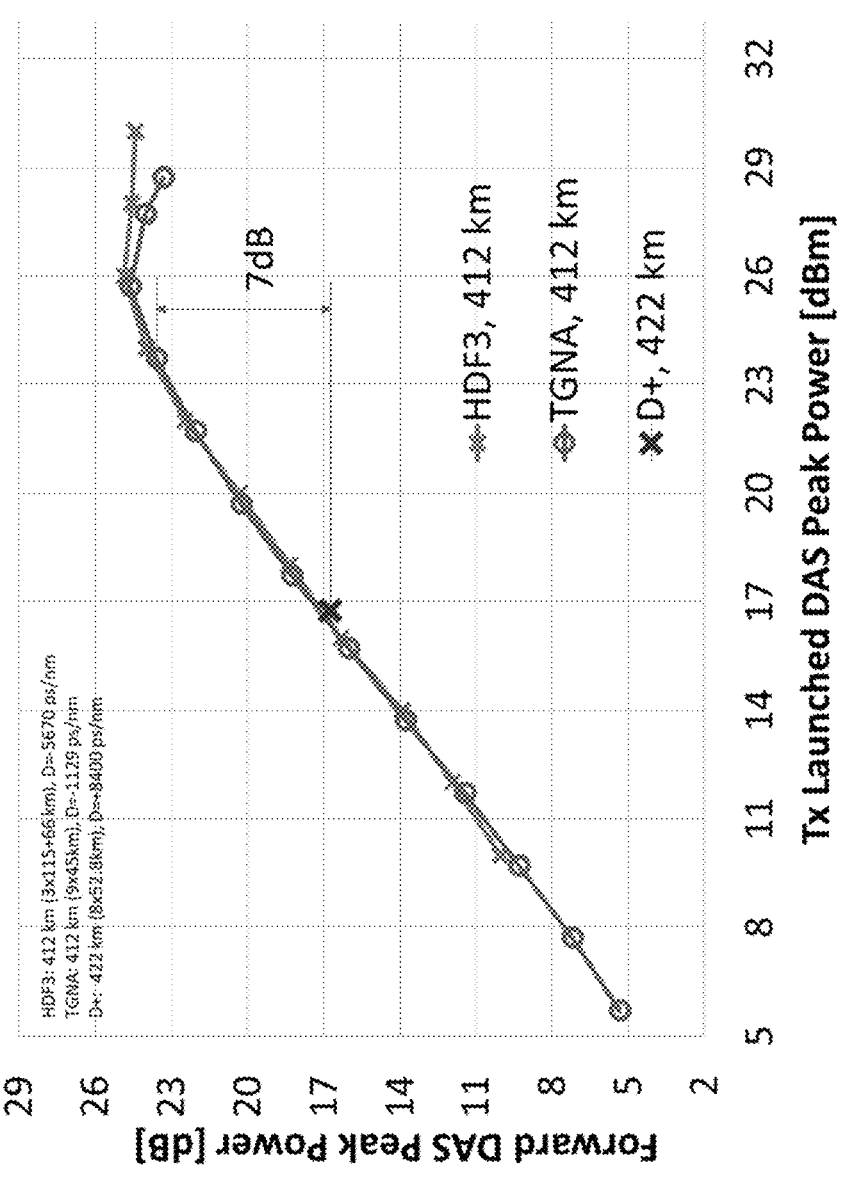
FIG. 3A shows the optimum sensing power comparison for a few testbeds with different fiber types and different accumulated dispersions.

FIG. 3A is a graph showing the measured optimum power using three different fiber types as a function of launch power. The D+ testbed consists of a low loss fiber with +20 ps/nm/km dispersion (accumulated dispersion is 8400 ps/nm after eight 52.8 km spans); the hybrid TGNA testbed uses both D+ and D– fibers (LMF1 and HDF2) with a net negative accumulated dispersion of –1130 ps/nm after 412 km, while the HDF3 testbed uses purely D– fiber with –14 ps/nm/km dispersion for a total accumulated dispersion –5670 ps/nm after 412 km at the DAS wavelength. As shown, the "D+" fiber tolerates the lowest sensing power while "HDF3" can tolerate the highest sensing power. Comparing the "HDF3" and "TGNA" measurement, a larger negative dispersion is better and can tolerate more power than TGNA, which exhibits ~5 times lower negative dispersion.

Figure 3B:
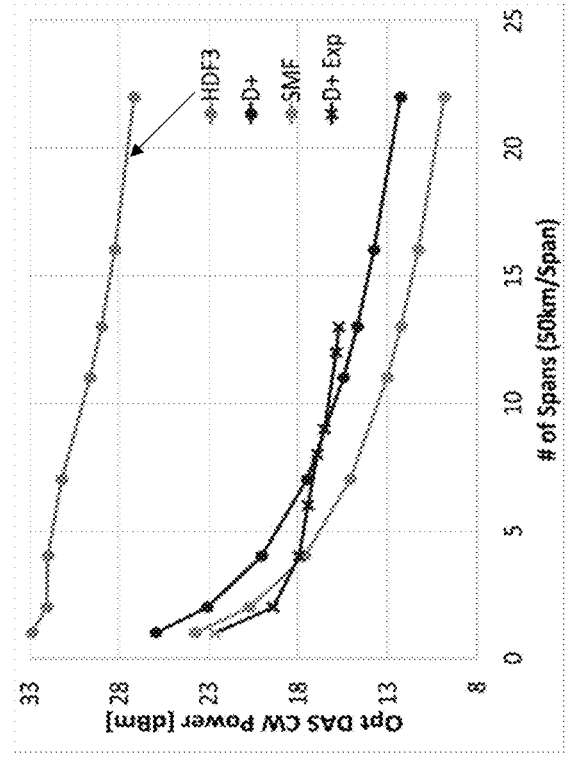
FIG. 3B depicts optimum sensing power vs number of spans.

FIG. 3B is a graph that shows the optimum sensing power vs. the number of sensing spans, where the span length is 50 km. As illustrated, a D– fiber (HDF3) can tolerate ~17 dB more optical power compared to standard single mode fiber (SMF) after 20 spans, and ~15 dB more optical power compared to the low loss D+ fiber after 20 spans; and furthermore the benefit of D– fiber (HDF3) increases as the number of spans increase.

Figures 4A, 4B:
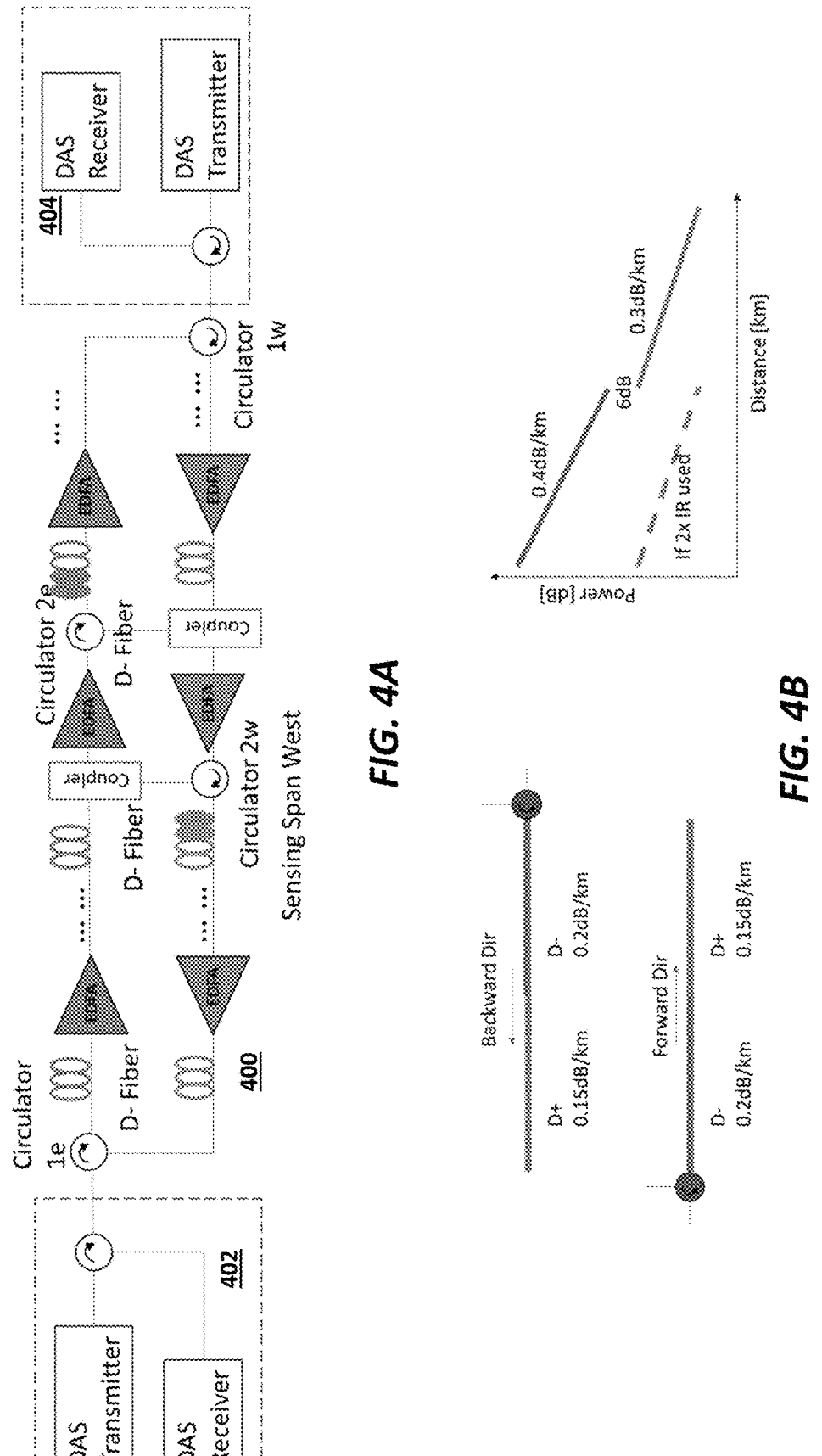
FIG. 4A and FIG. 4B show distributed sensing dispersion maps, in accordance with some embodiments of the disclo-sure.
Figure 4C:
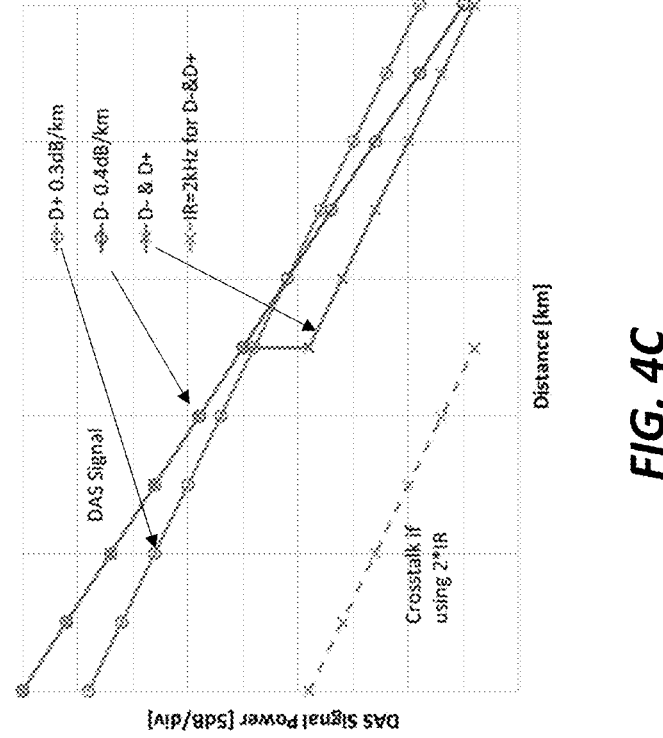
FIG. 4C shows the power evolution along the sensing fiber for a few different dispersion maps.

In accordance with additional embodiments of the disclosure, in a given DAS system, the span length may be doubled by sensing the first half of a span from each of two opposite directions. FIG. 4A depicts a DAS system 400, arranged with two DAS stations, DAS station 402 and DAS station 404, located on opposite ends of a link that includes multiple spans. In FIG. 4A, a first external circulator is provided, shown as circulator 1e and a second external circulator is provided shown as circulator 2e, where circulators may be coupled to a D– fiber. A third external circulator, shown as circulator 1W and fourth external circulator, shown as circulator 2W are provided, where circulators may be coupled to another fiber, such as a D+ fiber. The circulator 2e is also optically connected to a first coupler, as shown, while the circulator 2w is connected to a second coupler, as shown. This configuration facilitates improved functioning of a DAS system as described with respect to FIGS. 4B-4C.

FIG. 4B depicts schematically the portioning of an individual span into a hybrid structure. In this scenario, the D– fiber is used in the first half of a span as the sensing half, and an ultra-low loss D+ fiber is used as the second half of the span. Note that the loss of a D– fiber is higher relative to a D+ fiber (0.2 vs 0.15 dB/km), and the Rayleigh backscattering coefficient is also higher (–78.8 vs –84.8 dB/ns). With this novel dispersion map, assuming a 100 km span (50 km D– followed by 50 km D+), the following scenario applies (see also FIG. 4C): 1) 10 dB more power may be launched into the sensing span; 2) With the same launch power, the total loss of the DAS signal is similar if the whole span is made of D– fiber only (comparing blue and green curves); 3) 6-dB more Rayleigh power is available from the D– sensing section (comparing with a D+ sensing session); 4) 6-dB less crosstalk power from the $2^{nd}$ half of the span in the case of the hybrid D–/D+ span if 2*IR used (dashed green curve "IR=2 kHz for D– and D+").

The notable feature of this implementation is that the embodiment takes advantage of the fact that D– fiber can tolerate more optical power (leading to higher OSNR) and have a larger Rayleigh backscattering coefficient (higher DAS signal power in the receiver), while the D+ fiber has lower loss (higher input power to the next stage in-line erbium-doped fiber amplifier (EDFA), hence higher overall OSNR) and lower Rayleigh backscattering coefficient (lower crosstalk to the first half in the DAS receiver). Another advantage is that the hybrid span consisting of D– and D+ fiber will reduce the total path accumulated dispersion, hence reduce the burden of dispersion compensation in a DAS receiver.

In accordance with embodiments of the disclosure, a forward sensing DAS signal is transmitted as a pulsed signal having a very low duty cycle, as illustrated in the bottom six traces of FIG. 5. In a multi-span DAS sensing system, according to some embodiments, multiple sensing pulses may be generated by a DAS station (see DAS transmitter and DAS receiver in FIG. 2 or FIG. 4, representing a DAS station) at different wavelengths. In this approach, a transmitter may include multiple optical sources, each configured to generate a light pulse at a specific wavelength, different from the wavelength of the other optical sources. By providing wavelength-specific filters at the different spans, a loopback apparatus at each span may be configured to transmit a specific wavelength back to the DAS station, so a specific span may be identified by the wavelength of the returned Rayleigh backscattered signal, providing the ability to separately interrogate different spans. In the scenario of FIG. 5, each curve may represent the signals generated at a different wavelength. If all signals, generated at the different wavelengths, are aligned in time from the transmitter, the forward inline EDFAs will see a gigantic pulse (e.g., 150 ns), followed by no signal for a long period of time (0.5 ms)—a 150 ns pulse in a 0.5 ms window when using 30 m gauge length and 2 kHz interrogation rate. This scenario will lead to Q-switching of the following EDFAs in the link, and may cause catastrophic damage to a DAS system.

The salient feature of the implementation of FIG. 5 is that different sensing pulses (corresponding to pulses launched at different wavelengths) are staggered in time in both the forward and backward direction. Staggering the sensing pulses in time, will reduce EDFA transient effects as well as reduce the nonlinearities in the transmission/sensing fiber. An example of the sum of the different individual traces at different wavelengths is shown as the top trace of FIG. 5, where the individual pulses are temporally resolved. Accordingly, high sensing power can be maintained in a multi-span system using this staggered-in-time approach for launching different DAS signals (sensing pulses) corresponding to different wavelengths.

Note that the backward Rayleigh signal power is not constant as a function of time (or distance). The power decreases according to in the first span (see blue trace "Span 1" in FIG. 6). If the powers from all spans are aligned in the same way, then all inline EDFAs in the reverse direction will see the same power variation. By staggering the sensing pulses sent from the transmitter and properly selecting the interrogation rate, the backward Rayleigh signal can be staggered in time, as shown in FIG. 6. Note that the topmost curve illustrates the sum of the Rayleigh signal over the different spans. The amplitude of this sum does not vary as markedly as the amplitude of the individual signals from the individual spans.

In further embodiments of the disclosure, this technique can also be used in sensing systems using other types of optical fibers, e.g. SMF, low loss D+, and other specialty sensing fibers, etc.

Note also that in a multiple span sensing DAS system, the NLI accumulates in the forward direction, but the sensing signal is only needed at the specific sensing span—the backscattered Rayleigh signal is then collected by a circulator at the input of the sensing span. In accordance with further embodiments of the disclosure, to reduce the nonlinearity in the forward direction, the power of the sensing signal at a specific wavelength/frequency may be lowered in all other spans and the sensing signal can be amplified to a higher level before entering the sensing span. This scenario is depicted in FIG. 7.

In different non-limiting embodiments, the local amplification of a sensing signal may be achieved by different approaches: 1) The sensing signal may be filtered out from other WDM channels, rerouted through a high gain amplifier, then added back to the rest of the WDM signal; 2) The forward sensing signal may be amplified by a very high gain amplifier, then the rest of the signal (except for the wavelength used for the current sensing span) will be attenuated by a wavelength selective optical attenuator (e.g. wavelength selective switch, etc.); 3) The sensing signal may be selectively amplified with a wavelength selective optical amplifier, such as parametric amplification using a known phase-matched FWM process or using a known phase-controlled nonlinear optical loop mirror. In other embodiments, this technique can also be used in sensing systems using other types of optical fibers, e.g. SMF, low loss D+, acoustically sensitive fiber (ASF), etc.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A system comprising:

a distributed acoustic sensing (DAS) station, comprising a DAS transmitter to launch an outbound DAS signal in a first direction, over at least one span of an optical communications link, and a DAS receiver to receive and analyze a backscattered Rayleigh signal, based upon the outbound DAS signal, wherein the DAS station is a first DAS station, the outbound DAS signal is a first outbound DAS signal, the backscattered Rayleigh signal is a first backscattered Rayleigh signal, the DAS transmitter is a first DAS transmitter, and the DAS receive is a first DAS receiver, the system further comprising:

a second DAS station, comprising:

a second DAS transmitter to launch a second outbound DAS signal in a second direction, opposite the first direction, over the at least one span;

a second DAS transmitter to launch a second outbound DAS signal in a second direction, opposite the first direction, over the at least one span;

a second DAS receiver to receive a second backscattered Rayleigh signal, based upon the second outbound DAS signal, wherein the at least one span comprises a sensing span;

a first a first external circulator to route the DAS signal to a first span of the at least one span, the first span being adjacent to the first DAS station;

a third external circulator to route the second outbound DAS signal to a second span of the at least one span, the second span being adjacent to the second DAS station, wherein the first DAS signal is transmitted over a first D− fiber in a first half of the sensing span, and is transmitted over a first D+ fiber over a second half of the sensing span, and the second DAS signal is transmitted over a second D− fiber in the second half of the sensing span and is transmitted over a second D+ fiber over the first half of the sensing span;

a second external circulator to route the first outbound DAS signal from the D− fiber to the D+ fiber, within the sensing span; and a fourth external circulator to route the second outbound DAS signal from the D+ fiber to the D− fiber, within the sensing span.

2. The system of claim 1, wherein the DAS station is arranged to launch a plurality of outbound DAS signals as a plurality of pulses at a plurality of different wavelengths, respectively, wherein the plurality of outbound DAS signals are staggered so as not to overlap with one another in time.

3. The system of claim 2, wherein the at least one span comprises a plurality of spans, wherein a first backscattered Rayleigh signal is received from a first span, and a second backscattered Rayleigh signal is received from a second span, and wherein the first backscattered Rayleigh signal is staggered in time from the second backscattered Rayleigh signal.

4. The system of claim 1, wherein the at least one span comprises a plurality of spans, wherein the system is arranged such that a power of the outbound DAS signal at a determined frequency is amplified to a higher level before entering a sensing span of the at least one span, and wherein the power of the outbound DAS signal at the determined frequency is lowered in all other spans of the plurality of spans.

5. An undersea optical communications system comprising:

a communications cable that extends over a plurality of spans of an optical communications link; and a distributed acoustic sensing (DAS) station, comprising a DAS transmitter to launch an outbound DAS signal in a first direction, over the at least one span of the optical communications link, and a DAS receiver to receive a backscattered Rayleigh signal, based upon the outbound DAS signal, wherein the DAS station is a first DAS station, the outbound DAS signal a first outbound DAS signal, the backscattered Rayleigh signal is a first backscattered Rayleigh signal, the DAS transmitter is a first DAS transmitter, and the DAS receive is a first DAS receiver, the system further comprising:

a second DAS station, comprising:

a second DAS transmitter to launch a second outbound DAS signal in a second direction, opposite the first direction, over the at least one span;

a second DAS transmitter to launch a second outbound DAS signal in a second direction, opposite the first direction, over the at least one span;

a second DAS receiver to receive a second backscattered Rayleigh signal, based upon the second outbound DAS signal, wherein the at least one span comprises a sensing span, a first a first external circulator to route the DAS signal to a first span of the at least one span, the first span being adjacent to the first DAS station;

a third external circulator to route the second outbound DAS signal to a second span of the at least one span, the second span being adjacent to the second DAS station, wherein the first DAS signal is transmitted over a first D− fiber in a first half of the sensing span, and is transmitted over a first D+ fiber over a second half of the sensing span, and the second DAS signal is transmitted over a second D− fiber in the second half of the sensing span and is transmitted over a second D+ fiber over the first half of the sensing span;

a second external circulator to route the first outbound DAS signal from the D− fiber to the D+ fiber, within the sensing span; and a fourth external circulator to route the second outbound DAS signal from the D+ fiber to the D− fiber, within the sensing span.

6. The communications system of claim 5, wherein the DAS station is arranged to launch a plurality of outbound DAS signals as a plurality of pulses at a plurality of different wavelengths, respectively, wherein the plurality of outbound DAS signals are staggered so as not to overlap with one another in time.

7. The communications system of claim 6, wherein the at least one span comprises a plurality of spans, wherein a first backscattered Rayleigh signal is received from a first span, and a second backscattered Rayleigh signal is received from a second span, and wherein the first backscattered Rayleigh signal is staggered in time from the second backscattered Rayleigh signal.

8. The communications system of claim 5, wherein the at least one span comprises a plurality of spans, wherein the system is arranged such that a power of the outbound DAS signal at a determined frequency is amplified to a higher level before entering a sensing span of the at least one span, and wherein the power of the outbound DAS signal at the determined frequency is lowered in all other spans of the plurality of spans.

9. A method of performing distributed acoustic sensing (DAS), comprising:

launching an outbound DAS signal from a DAS transmitter of a DAS station in a first direction, over undersea optical fiber, routing the outbound DAS signal using a first external circulator to a local span of a multi-span link, adjacent to the DAS station;

routing the outbound DAS signal through a sensing span of the multi-span link, different from the local span, using a second external circulator; and routing a backscattered Rayleigh signal, derived from the outbound DAS signal through the second external circulator in a second direction, opposite the first direction; and routing the backscattered Rayleigh signal to a DAS receiver at the DAS station, using the first external circulator, wherein the DAS station is a first DAS station, the outbound DAS signal is a first outbound DAS signal, the backscattered Rayleigh signal is a first backscattered Rayleigh signal, the DAS transmitter is a first DAS transmitter, the DAS receiver is a first DAS receiver, and the local span is a first local span, the method further comprising:

launching a second outbound DAS signal in the second direction, from a second DAS transmitter of a second DAS station over the multi-span link;

routing the second outbound DAS signal to a second local span of a multi-span link, adjacent to the second DAS station, using a third external circulator;

routing the second outbound DAS signal through the sensing span of the multi-span link, using a fourth external circulator;

routing a second backscattered Rayleigh signal, derived from the second outbound DAS signal through the fourth external circulator in the first direction; and routing the second backscattered Rayleigh signal to a second DAS receiver at the second DAS station, using the third external circulator wherein the first outbound DAS signal is routed through the D− fiber in a first half of the sensing span, and is routed through a D+ fiber is a second half of the sensing span, and wherein the second outbound DAS signal is routed through the D− fiber the second half of the sensing span, and is routed through the D+ fiber is the first half of the sensing span.

\* \* \* \* \*